United States Patent
Hanelt

(10) Patent No.: US 7,311,952 B2
(45) Date of Patent: Dec. 25, 2007

(54) LIQUID CRYSTALLINE FILM WITH BROADENED REFLECTION BANDWIDTH AND PROCESS FOR PREPARATION THEREOF

(75) Inventor: Eckhard Hanelt, Geltendorf (DE)

(73) Assignee: Wacker Chemie AG, Munich (DE)

( * ) Notice: Subject to any disclaimer, the term of this patent is extended or adjusted under 35 U.S.C. 154(b) by 203 days.

(21) Appl. No.: 11/293,344

(22) Filed: Dec. 2, 2005

(65) Prior Publication Data

US 2006/0083866 A1 Apr. 20, 2006

Related U.S. Application Data

(63) Continuation of application No. PCT/EP2004/003174, filed on Mar. 25, 2004.

(30) Foreign Application Priority Data

Jun. 5, 2003 (DE) .................. 103 25 610

(51) Int. Cl.
*C09K 19/38* (2006.01)
*G02F 1/1335* (2006.01)

(52) U.S. Cl. ............... 428/1.3; 428/1.1; 428/1.31; 349/96; 349/115; 252/299.01; 252/585

(58) Field of Classification Search ........... 428/1.1, 428/1.3, 1.31; 349/113, 115, 96–97; 252/299.01, 252/299.7, 585–589
See application file for complete search history.

(56) References Cited

U.S. PATENT DOCUMENTS

| 4,293,435 | A |   | 10/1981 | Portugall et al. |
|---|---|---|---|---|
| 4,637,896 | A |   | 1/1987 | Shannon |
| 5,235,443 | A |   | 8/1993 | Barnik et al. |
| 6,099,758 | A |   | 8/2000 | Verrall et al. |
| 6,177,216 | B1 | * | 1/2001 | Broer et al. .............. 430/7 |
| 6,573,963 | B2 |   | 6/2003 | Ouderkirk et al. |
| 6,669,999 | B2 | * | 12/2003 | Hsieh et al. ............ 428/1.3 |
| 2002/0012766 | A1 |   | 1/2002 | Faris et al. |

FOREIGN PATENT DOCUMENTS

| DE | 19726051 | 12/1998 |
|---|---|---|
| DE | 19842701 | 4/1999 |
| EP | 0302619 | 2/1989 |
| EP | 0358208 | 3/1990 |
| EP | 0446912 | 9/1991 |
| EP | 0601483 | 6/1994 |
| EP | 0606939 | 7/1994 |
| EP | 0606940 | 7/1994 |
| EP | 0617111 | 9/1994 |
| EP | 0631157 | 12/1994 |
| EP | 0685749 | 12/1995 |
| EP | 0875525 | 11/1998 |
| EP | 0881509 | 12/1998 |
| EP | 0885945 | 12/1998 |
| EP | 0982605 | 3/2000 |
| EP | 1046692 | 10/2000 |
| EP | 1059282 | 12/2000 |

OTHER PUBLICATIONS

English Derwent Abstract AN1999-037051 (04); corres. to DE 197 26 051 A1.
English Derwent Abstract AN1999-183381 (16); corres. to DE 19842701 A1.
R. Maurer et al., SID 90 DIGEST, "Polarizing Color Filters Made From Cholesteric LC Silicones", 1990, pp. 110-113.
English Derwent Abstract, AN1998-559398 (48) . Corres. to EP 0875525 A1.
English Derwent Abstract AN1990-076958 (11); Corres. to EP 0358208 A2.
English Derwent Abstract AN1994-184914 (23); Corres. to EP 0601483 A1.
English Derwent Abstract AN1995-031733 (05); Corres. to EP 0631157 A1.
English Derwent Abstract AN2001-041728 (06); Corres. to EP 1059282 A1.
English Derwent Abstract AN1991-275546 (08); Corres. to EP 0446912 A1.
English Derwent Abstract AN2000-681133 (67); Corres. to EP 1046692 A1.
English Derwent Abstract AN1996-012531 (02); Corres. to EP 0685749.
Ishihara et al., "Preparation and Properties of Optical Notch Filters of Cholesteric Liquid Crystals", POLYMER, vol. 29, 1988, pp. 2141-2145.
Mazkedian et al., "On the Circular Dichroism and Rotatory Dispersion In Cholesteric Liquid Crystals With A Pitch Gradient", Le Journal De Physique, 37, 1976, p. 731.
Hajdo et al., "Theory of Light Reflection by Cholesteric Liquid Crystals Possessing A Pitch Gradient", J. Opt. Soc. Am., vol. 69, No. 7, Jul. 1979, p. 1017.
Vill et al., database published under the name "LiqCryst", corres. to English Abstract.
Maurer et al., "Cholesteric Reflectors with a Color Pattern", SID International Symposium Digest of Technical Papers, vol. 25, San Jose, Jun. 14-16, 1994, pp. 399-402.
Portugall et al., "Synthesis and Phase Behaviour of Liquid Crystalline Polyacrylates", Makromol. Chem., 183, 1982, p. 2311.

* cited by examiner

*Primary Examiner*—Rena Dye
*Assistant Examiner*—Sow-Fun Hon
(74) *Attorney, Agent, or Firm*—Brooks Kushman P.C.

(57) ABSTRACT

Reflective liquid crystalline polymer films having increased bandwidth have a single layer of liquid crystalline material with short, long, and medium pitch of the helical molecular structure of the liquid crystalline polymer. The films are easily produced by a readily reproducible and economic process of low complexity.

21 Claims, No Drawings

LIQUID CRYSTALLINE FILM WITH BROADENED REFLECTION BANDWIDTH AND PROCESS FOR PREPARATION THEREOF

CROSS-REFERENCE TO RELATED APPLICATIONS

This application is a continuation of PCT application Ser. No. PCT/EP2004/003174, filed Mar. 25, 2004, to which priority is claimed, and which claims the benefit of German Application No. 103 25 610.5, filed Jun. 5, 2003, to which priority is also claimed.

BACKGROUND OF THE INVENTION

1. Field of the Invention

The invention relates to a polymer film having a helical molecular structure with adjustable pitch gradient, to a process for its production, and to its use.

2. Description of the Related Art

Many optical applications utilize films which convert unpolarized light to polarized light by absorbing one polarization component of the light. In the ideal case, a maximum of 50% of the light is allowed to pass through such a polarization film. In addition to the loss of light yield, this process has the further disadvantage that, especially in the case of bright light sources, the absorption results in intense heating of the polarizer. Both disadvantages are avoided in the case of reflective polarizers which reflect the fraction of the undesired polarization back into the light source. Depending on the particular arrangement of the optical components of the light source, this fraction may change its polarization to the desired polarization by reflection or scattering and thus contribute at least partly to an increase in the light yield.

One example of a reflective polarizer is described in U.S. Pat. No. 5,235,443, in the form of films of cholesteric liquid crystals. Cholesteric liquid crystals are substances having a helical alignment of molecules. A thin layer thereof may be prepared between two suitable substrates in such a way that the helix axis is at right angles to the substrate surfaces. The pitch of the helix is material-dependent and is constant over the layer thickness. Such a layer reflects a circular light component virtually fully when sense of rotation and wavelength $\lambda$ of the light in the material coincide with the sense of rotation and the pitch p of the cholesteric helix and the layer thickness is a multiple of the pitch (cholesteric reflection). In contrast, the second circular light component having opposite sense of rotation, and light components having other wavelengths are, in the ideal case, allowed to pass through fully. When required by the application, the circular-polarized light fraction may be converted to linear-polarized light by an additional quarter-wave retardation layer.

Cholesteric reflection occurs in a spectral band between two wavelengths $\lambda_1 = p \cdot n_o$ and $\lambda_2 = p \cdot n_e$ where $n_e$ and $n_o$ denote the extraordinary and ordinary refractive index of the material, respectively. This band is characterized by the center wavelength $\lambda_0 = p \cdot n$ which depends upon the average refractive index $n = (n_o + n_e)/2$ and upon the pitch p of the material, and the width $\Delta\lambda = p \cdot \Delta n$ which is determined at a given pitch p by the birefringence $\Delta n = n_e - n_o$. In practice, the birefringence of most cholesteric materials in the visible spectral region is restricted to values of less than 0.3. From this follows a maximum possible bandwidth of about 100 nm, although usually only bandwidths of from 30 nm to 50 nm are achieved. The intensity of the light reflected in the cholesteric band increases with the number of pitches $\lambda_{0/n}$ in the layer, and for unpolarized incident light, achieves the maximum value at 50% of the incidence intensity. Only above a layer thickness of about three pitches can reflection be observed. The minimum layer thickness required for most cholesteric materials in the visible spectral region is therefore a few μm.

A prerequisite for the use of liquid-crystalline materials in applications such as a reflective polarizer or as LC pigments is sufficient thermal and mechanical stability of the helical molecular structure. This stability may be achieved by fixing the state of alignment by polarization or by rapid cooling to temperatures below the glass point. Such stable cholesteric layers are described, for example, by R. Maurer et al. in "Polarizing Color Filters made from Cholesteric LC Silicones" in SID 90 Digest, 1990, p. 110-113.

In addition to application as a polarization film, the literature describes additional applications of cholesteric films in various optical elements which will not be further detailed here. In all applications, the center wavelength $\lambda_0$ and the width $\Delta\lambda$ of the cholesteric band should be adjusted precisely. For specific applications as a reflective polarizer, which are used, for example, to improve brightness of an LCD, it is especially necessary that the reflection band covers the entire visible spectral region, i.e. that the bandwidth $\Delta\lambda$ should be more than 300 nm. However, the reflection properties of such films and in particular the polarization of the light allowed to pass through depend on the viewing angle relative to the normal on the film. The band of a reflective polarizer should cover at least the region from 450 nm to 600 nm for all relevant viewing angles. In order to compensate for the effect of color shifting as a function of the viewing angle which is described by S. Ishihara et al. in "Preparation and properties of optical notch filters of cholesteric liquid crystals" in POLYMER, Vol. 29, 1988, p. 2141-2145, the band should therefore, for example, range from at least 450 nm to 850 nm for a desired viewing angle range of up to 45° from a right angle to the surface of the display. Moreover, the films should additionally be very thin, in order to minimize the viewing angle dependence of the polarization. For broadband LC pigments which, for example, can generate special color effects in the visible region, lower bandwidths of around 100 nm are also required—however, these should be achieved in layers having a thickness of less than 6 μm.

One way of producing polymer films having a bandwidth $\Delta\lambda$ which is greater than the $\lambda_0 \cdot (n_e - n_o)/n$ value corresponding to the liquid-crystalline material as described by Maurer et al. is to provide an optical element composed of a plurality of cholesteric layers having different center wavelengths. However, this method is very cost-intensive and has the disadvantage that the optical quality decreases with every additional layer as a consequence of scattering at defect sites and inhomogeneities. In addition, this process cannot be employed for LC pigments, because total thicknesses of below 6 μm are difficult to realize using a plurality of thinner individual layers. A more suitable method for producing a broadband cholesteric polarizer is to replace the sequence of individual layers having constant pitch of the helical molecular structure by a single layer having continuously increasing or decreasing pitch. The broadening of the reflection band by virtue of a gradient in the pitch of the helix (pitch gradient) has been known for some time from theoretical investigations (for example S. Mazkedian, S. Melone, F. Rustichelli, J. Physique 37, 731 (1976) or L. E. Hajdo, A. C. Eringen, J. Opt. Soc. Am. 36, 1017 (1979)). According to the current state of the art, there are several industrial processes which enable a layer having a pitch gradient to be produced. They can be divided substantially into the following three categories:

1. generation of a crosslink density gradient and diffusion of the uncrosslinked components,
2. lamination of at least two layers having different chemical compositions, and subsequent diffusion, and
3. depth-dependent extraction of nonpolymerized fractions from a semipolymerized film.

Each of these processes requires specific material mixtures which are formulated for the particular process.

European patent application EP 0 606 940 A2 describes a process in which a mixture of chiral and nematic monomers having different reactivity with regard to their polymerization properties is polymerized over a prolonged period with a low UV dose, so that diffusion of the monomers occurs during the polymerization and then generates a pitch gradient as a consequence of the mixed material composition. The driving force for the diffusion is a gradient in the crosslinking density which is caused by a gradient in the UV intensity in the material. The reduction in the UV intensity in the film is controlled by adding a dye, which, however, has disadvantages for the stability and the optical properties of the film. Owing to the requirement that the film finally has to be fully polymerized in order to achieve good mechanical stability, a high UV absorption is not possible and therefore the UV gradient in the film is not particularly steep. This makes the overall process relatively slow, and thus the process has only limited suitability for industrial preparation of a broadband cholesteric polarizer on a continuous substrate, for example a plastics film. The weak UV gradient also has an effect on the pitch gradient, so that the minimum thickness of the layer for a required width of the reflection band is not sufficient for applications in which thin layers of below 10 µm are required. In the examples of EP 0 606 940 A2, the layer thicknesses of the films are 20 µm.

The process described in European patent application EP 0 982 605 A1 also utilizes absorption of the UV radiation in a cholesteric layer in order to generate a pitch gradient. In the LC mixtures used, a transition from the cholesteric to a smectic phase proceeds during the polymerization and brings about untwisting of the helical structure. This process is potentially more rapid than a pure diffusion process, although broadband films are not achieved in the examples cited below an irradiation time of 30 s. A further disadvantage of this method is that the realignment of the mesogens into the smectic phase leads to the formation of small domains. The light scattering caused by the domain borders reduces the degree of polarization of the light allowed to pass through.

A further process described in European patent application EP 0 885 945 A1 overcomes the disadvantage of the slow diffusion process caused by the weak crosslinking density gradient in the process of EP 0 606 940 A2, by dividing the UV irradiation procedure into two steps between which a change in the temperature of the film takes place. In this method, the thermochromic property of the cholesteric phase is utilized and leads to a rapid realignment of the mesogens and therefore to a more rapid setting of the pitch in the zones of the film having different degrees of crosslinking. However, a disadvantage of this process is that the necessary bandwidth of above 300 nm is difficult to achieve under the necessary conditions for industrial production.

U.S. Pat. No. 6,099,758 A claims a process in which the crosslinking density gradient is increased by a further gradient occurring in addition to the UV gradient by virtue of the inhibiting influence of the substrates used. Although this process is more rapid than that described in EP 0 606 940 A2, broadband films are not achieved in the examples cited below an irradiation time of 30 s. Owing to the low total UV doses which are obtained from the specified irradiation times and UV intensities, the thermal and mechanical stability of the films are low. The production process becomes technically complicated in that the cholesteric film either has to be produced between two different substrates, or in that, when a single substrate is used and polymerization is effected in an air atmosphere, an additional oxygen barrier layer on the substrate is necessary.

Likewise described in EP 0 606 940 A2 is a process in which two layers having different chemical compositions, of which one has cholesteric alignment, are brought into contact. The cholesteric layer is swollen by diffusion so that a pitch gradient results. Finally, the film is polymerized. In another embodiment of this process in the European laid-open specification EP 0 881 509 A2, two cholesteric films having different pitch are laminated and melted by controlled diffusion at elevated temperature in such a way that a continuous transition between the two pitches results. A disadvantage of this process is the complicated production of at least two different layers and the technically difficult control of the diffusion process between the two layers.

European patent application EP 0 875 525 A1 discloses a semipolymerized cholesteric films on a substrate, prepared by immersing the coated substrate in baths of organic solvents which bring about extraction of nonpolymerized fractions in the film. Since this effect has the greatest intensity at the surface of the film, depth-dependent shrinkage and thus a pitch gradient are generated after drying and heat-treating the film. In order to obtain reproducible results, large amounts of solvents have to be constantly exchanged, which is undesirable from the environmental protection point of view. The necessary purification of these solvents and the complicated process control additionally increase the costs considerably.

In the existing patent literature, there is discussion with sometimes contradictory results as to how a cholesteric polarizer prepared by the above-described processes has to be aligned in an LCD in order to achieve a very high light yield with very low dependence upon the viewing angle. In the case of the arrangement of the cholesteric polarizer between the light source and the electrically switchable liquid crystal cell, it is possible that, in an asymmetric film having continuous pitch gradient, which has previously been described in the existing examples as a constant gradient, or, in the mathematical sense, as a monotonously rising or falling gradient, for either the side having shorter pitch or the side having longer pitch to face in the direction toward the light source. In the case of the symmetrical film hypothetically described in U.S. Pat. No. 6,099,758 A, there is no preferred direction.

SUMMARY OF THE INVENTION

It has now been surprisingly discovered, that for low viewing angle dependence of light yield and color, an advantageous arrangement of helical structure in a liquid crystalline film is achieved by employing a film whose pitch distribution has a sequence of short, long and medium pitches which correspond approximately to the reflection colors blue, red and green, and in which the short pitch is preferably nearest the light source. Such a distribution of the pitches could only be produced in accordance with the prior art by a multilayer film structure, which, however, as described above, would require a complicated process.

The present invention therefore provides a polymer film having a helical molecular structure which, in a direction at right angles to the film surface, contains a sequence of short, long and medium pitch of the helical structure, the pitch being calculated from reflection wavelength/average refractive index, the polymer film produced from a single layer of a mixture of polymerizable liquid-crystalline material, and wherein the change between short and long pitch takes place in less than ten turns of the helical structure, the layers with the short, long and medium pitches having a layer thickness of at least three pitches in each case.

It is one of the objects of the present invention to provide a polymer film which, for example when used in an LCD, generates very high amplification of brightness at very low variation of relative view angle dependence on brightness and color of the LCD. These and other objects are achieved by a polymer film having a helical molecular structure which, in a direction at right angles to the film surface, contains a sequence of a short, long and medium pitch of the helical structure.

DETAILED DESCRIPTION OF THE PREFERRED EMBODIMENT(S)

In order to enable a simple production process, it was necessary to develop a film which is prepared from a single layer of a mixture of polymerizable liquid-crystalline material. In this film, the transition between short and long pitch preferably takes place in less than ten turns of the helical structure, and great preference is given to a rapid transition in less than five turns. The invention also relates to further uses of this film.

The existing production processes for cholesteric polymer films having a gradient of pitch have the above-described specific advantages and disadvantages. It has hitherto not been possible by any of these processes to realize fully continuous industrial production of a broadband reflective polarizer suitable for an LCD, or production of broadband LC pigments, which requires only a single coating operation on a single substrate. The inventive polymer film having adjustable gradient of the pitch of a helical molecular structure can be prepared by a process comprising the steps of:

1) applying a mixture of polymerizable liquid-crystalline material which comprises
   a) least one mesogenic group and at least one polymerizable functional group, and
   b) a chiral compound, in a layer on a substrate, 2) aligning the material in such a way that the mesogenic groups become arranged in a helical structure whose axis runs transverse to the layer,
3) partially polymerizing this layer by the action of actinic radiation in an environment which has an inhibiting action on the polymerization, and
4) final fixing after the material has become newly aligned in the semipolymerized structure, by fully polymerizing the film or cooling the film into the glass state.

The invention thus likewise provides a process for producing a polymer film having adjustable gradient of the pitch of a helical molecular structure, comprising the steps of:

1) applying a mixture of polymerizable liquid-crystalline material which comprises
   a) monomers or oligomers, each of which have at least one mesogenic group and at least one polymerizable functional group, and
   b) a chiral compound, in a layer on a substrate, 2) aligning the material in such a way that the mesogenic groups become arranged in a helical structure whose axis runs transverse to the layer,
3) partially polymerizing this layer in an environment which has an inhibiting action on the polymerization by the brief action of actinic radiation, and
4) final fixing after a defined waiting time during which the material has become newly aligned in the semipolymerized structure, by fully polymerizing the film or cooling the film into the glass state.

The process according to the invention now makes available THE inexpensive industrial manufacture of a polymer film having a broad reflection band, by which the above-detailed disadvantages of the prior art are avoided.

It has been found, surprisingly, that the polymer films having the helical molecular structure produced by this process have a distinctly broader reflection band than films composed of the same material which have been polymerized between two substrates or under a nitrogen atmosphere. As in EP 0 606 940 A2, a gradient is generated in the crosslinking density of the cholesteric layer but is attributable here not to an intensity gradient of actinic radiation, but rather to a gradient in the inhibiting influence of the environment. The inhibiting influence of the environment is based on the diffusion of molecules from the environment into the cholesteric layer which function therein as free radical scavengers. The brief action of actinic radiation forms a defined amount of radicals in the layer, only some of which are neutralized by the free radical scavengers already present in the cholesteric layer. At this time, the distribution of the free radicals and free radical scavengers is approximately constant over the entire layer thickness. The remaining free radicals start a polymerization which is stopped again in its further course by the molecules from the environment diffusing into the layer. This diffusion is slow enough that a much steeper gradient is generated than the absorption of the actinic light. The gradient is set by matching time and intensity of the brief irradiation to the diffusion constant and the polymerization rate. A long-lasting irradiation as in U.S. Pat. No. 6,099,758 A, EP 0 606 940 A2 and the other prior art processes is therefore not required.

The pitch gradient of the helical structure $dp/dx$ (x=location coordinates at right angles to the surface of the layer) is preferably adjusted in such a way that the intensity of reflected light is very high and the thickness of the polymer film is very low. If a layer thickness of at least three pitches is assumed for a sufficient intensity in the reflection band, a maximum gradient of $dp/dx<0.33\Delta\cdot\Delta n/n$ follows. However, even steeper gradients are possible when the associated loss of reflected light intensity can be tolerated in the particular application. It is a particular advantage of this process compared to the prior art that such steep gradients can be realized in the pitch of the helical structure of an individual layer. This enables the production of polymer films having broadened reflection bands at minimum layer thicknesses. The layer thicknesses of the inventive polymer films are preferably thicker than $2/\Delta n$ times and thinner than $20/\Delta n$ times the desired width of the reflection band. For the application as a reflective polarizer, the polymer films are more preferably, thicker than $3/\Delta n$ times and thinner than $6/\Delta n$ times the desired width of the reflection band. Polymer films according to the invention which satisfy these criteria exhibit a greatly reduced viewing angle dependence of the polarization of light allowed to pass through in the reflection band. For a polymerizable liquid-crystalline material having $\Delta n$ of about 0.2 and a desired width of the reflection band of 300 nm, polymer films of thickness from 5 µm to 10 µm are sufficient to produce a reflective polarizer. The requirement for broadband LC pigments having layer thicknesses below 6 µm can also be satisfied by this process. Prior art processes which are based on generation of a crosslinking density gradient with subsequent diffusion of the uncrosslinked components (for example DE 198 42 701 A1, EP 0 606 940 A2) usually only provide layer thicknesses of 15 µm and more.

The partial polymerization is started by defined irradiation with actinic light at a temperature within a phase range having helical alignment of the mesogens. It is not necessary that, as described in EP 0 606 940 A2, an intensity of the actinic radiation varying over the layer thickness acts on the polymerizable liquid-crystalline material. In contrast, it is advantageous for the stability and the optical properties of the film that no additional UV-absorbing dyes necessarily be added to the material and freedom from such dyes is preferred. In the process described here, the intensity profile of the actinic light in the layer is to be regarded as virtually constant because the absorption of the actinic light over the layer thickness of a few µm is low. Accordingly, such films without the action of an inhibiting environment exhibit no broadening of a cholesteric band (examples 1d and 1e). In contrast, polymer films, for example according to the teaching of DE 198 42 701 A1, exhibit broadening of the cholesteric band. If the polymerizable liquid-crystalline material used in accordance with the invention nevertheless has significant absorption for the actinic radiation, this is not a hindrance for the process described here, but rather can be used in some cases to optimize the bandwidth.

A further advantage of this process compared to the continuous irradiation with UV radiation of low intensity as in DE 198 42 701 A1 and EP 0 606 940 A2 is that the state of alignment achieved is fixed in a separate, subsequent step, so that a high thermal and mechanical stability of the film can be ensured. Critical to the application is, for example, the long-term stability of a reflective polarizer from the warm background illumination of an LCD. It has now been shown surprisingly, that a polymer film produced by the inventive process has sufficiently high stability for use in LCDs by a stability test at elevated temperature (example 1c). When the final fixing of the layer is effected by a polymerization reaction, this reaction is preferably initiated by irradiation with actinic light of high intensity, electron irradiation or free radical-forming thermal initiators such as peroxides. Preference is given to simultaneously reducing the inhibiting action of the environment. Particular preference is given to carrying out the final polymerization in an inert gas atmosphere, for example a nitrogen atmosphere. However, it is also possible, after the pre-illumination and a short waiting time, to laminate an impermeable polymer film to the partly polymerized film in order to reduce the inhibiting action of the environment during the final fixing.

Since oxygen is an inhibitor for polymerization reactions, the inhibiting environment used is preferably a gas which comprises oxygen. Particular preference is given to air or oxygen-enriched air. Another suitable gas having inhibiting action is, for example, nitrogen monoxide which, like oxygen, may also be used in a gas mixture. In order to stabilize the LC mixture against premature polymerization and to control the inhibiting action of the oxygen, the polymerizable liquid-crystal mixture preferably comprises a free radical scavenger which is activated by oxygen, for example 2,6-di-tert-butyl-4-methylphenol (BHT). The amount of this free radical scavenger is preferably 1-5000 ppm, more preferably 100-3000 ppm. Alternatively to a gaseous inhibiting environment, an inhibiting liquid or a solid, preferably in the form of a thin film, may also be temporarily brought into contact with the polymerizable material. For this purpose, it is also possible to apply a film having high permeability for the inhibiting substances to the polymerizable liquid-crystalline material.

The brief illumination with actinic light with subsequent waiting time during which the material becomes newly aligned makes an oxygen barrier layer on the inner surface of the substrate which is an obligatory requirement in DE 198 42 701 A1, unnecessary. Preference is given to using a substrate without any additional barrier layer. The waiting time is preferably selected to be sufficiently long that large domains form in the Grandjean texture, so that the fraction of scattered light caused by the domain borders amounts to less than a few percent of the total intensity. An asymmetric pitch gradient forms whose longest pitch is not necessarily, as required in DE 198 42 701 A1, at the surface of the film which faced the air in the course of production. In contrast, in examples 1c) and 2c) of the process according to the invention, pitch distributions are present which have a longer pitch on the side of the PET substrate than in the vicinity of the surface of the film which faced the air in the course of production. During the waiting time, the environmental temperature of the film can be changed, in order, as in EP 0 885 945 A1, to additionally utilize the thermochromicity of the cholesteric material. Preference is given to carrying out the process at constant temperature in the region of the liquid-crystalline phase.

For a suitable mixture of the polymerizable liquid-crystalline material, the profile of the crosslinking density in the film can be adjusted by matching the dose of the actinic radiation in the first illumination step and the concentration in the environment of the inhibiting molecules acting in the irradiation in such a way that the subsequent diffusion process results in a distribution of the pitches of the helical structure which has a sequence of short, long and medium pitch. In this case, the short pitch is approximately the pitch of the mixture of the polymerizable liquid-crystalline material in the aligned state which, after the first illumination step on the open surface, had been polymerized only to a slight extent, or not at all, owing to the active inhibition. The long pitch results from the swelling of the semipolymerized material in the vicinity of the open surface and the medium pitch is the pitch of the material on the side of the substrate which has been polymerized to a slightly greater extent and is therefore less swollen.

The pitches required for an inventive polymer film are calculated from the required reflection wavelength/average refractive index of the liquid-crystalline material in the polymerized state, the medium pitch in this formula corresponding to a wavelength in the center of the reflection band and the short and the long pitch corresponding to a shorter or longer wavelength which preferably differ by more than 10% from the medium wavelength and are more preferably at the edge of the cholesteric bandwidth required.

The polymerizable liquid-crystalline material preferably comprises mixtures of monomers or oligomers which have mesogenic groups and polymerizable functional groups and at least one chiral component, these monomers or oligomers differing in their reactivity with respect to the polymerization. Particular preference is given to polymerizable cholesteric liquid crystals comprising A) a monomer or oligomer, each of which has at least two polymerizable functional groups which are selected from the group consisting of (meth)acrylate ester, epoxy and vinyl ether groups, B) a liquid-crystalline monomer or oligomer, each of which has only one polymerizable functional group selected from the group consisting of (meth)acrylate ester, epoxy and vinyl ether groups, C) from 1 to less than 50% by weight, based on the polymerizable (A+B+C+D) mixture, of a monomer which contains no groups which can react with the polymerizable functional groups of monomers or oligomers (A) and (B), and D) a monomer or oligomer (D) having a chiral group.

In the description above, "a" means "one or more", and it is possible to use mixtures of each of the component groups (A) through (D).

In the context of this invention, mesogenic groups refer to those chemical groups which can give rise to liquid-crystalline properties in a molecule. Chemical compounds which contain mesogenic groups usually have a calamitic or discotic configuration. Rather than them having to have a liquid-crystalline phase themselves, it is sufficient when they contribute to a liquid-crystalline phase in a mixture with other mesogenic compounds. In principle, any mesogenic groups, for example, all mesogenic groups known in the literature, are suitable for components (A), (B) and (C). For example, a regularly updated collection of known mesogenic groups is published by V. Vill et al. as a database under the name LiqCryst (obtainable from LCI Publisher GmbH, Eichenstr. 3, D-20259 Hamburg). Preference is given to using those mesogenic groups which are readily accessible synthetically on an industrial scale and which result in compounds which have sufficient stability for use as a polymer film over a long period. Examples thereof are chemical structural elements such as carboxylic esters and alcohols based on phenyl, biphenyl, cyanobiphenyl, naphthyl and cyanonaphthyl derivatives, and also combinations of these groups.

A preferred embodiment is a polymer film according to the invention, which is characterized by a reflection band which has been broadened by at least 50% compared to the unpolymerized state.

A further preferred embodiment relates to a structured polymer film having helical molecular structure, wherein actinic radiation acts through a mask in the course of the partial polymerization and/or in the course of the final fixing, and the mask is subsequently altered or replaced by a second mask, and this process step is repeated optionally with alteration of further process parameters in such a way that a portion of the material which is yet to be finally fixed is irradiated with actinic radiation. Such a structured polymer film having helical molecular structure is particularly suitable, for example, as a color filter for an LCD display, since the bandwidth of the color pixels can be precisely adjusted in order to optimize the hue and the brightness of the display.

Another preferred embodiment of the invention relates to LC pigments having a helical molecular structure which are prepared by comminuting, in a subsequent process step, a polymer film prepared according to the invention.

The invention also relates to a process for producing a polymer film having a helical molecular structure. The literature discloses various continuous or batchwise processes for producing optically anisotropic polymer films from polymerizable mixtures. In these processes, the polymerizable mixture is applied to a substrate, aligned and subsequently fixed by a chemical reaction or by cooling into the glass state.

The application of the polymerizable mixtures to the substrate surface may be carried out in solution or as a solvent-free melt above the glass point of the mixture, for example by spincoating, by application employing a doctor blade, or with a roller. If a solvent is used for the application, it is removed in a subsequent drying step. The thickness of the dry LC layer on the substrate determines the number of pitches of the helical structure and thus the shape of the reflection band. The preparation of polymer films having one open side in melt application and from a solution are described, for example, in the European laid-open specifications EP 0 358 208 A1 and EP 0 617 111 A1. To improve the wetting of the substrate or the alignment of the mesogens on the open surface, the polymerizable mixtures, as shown in EP 0 617 111 A1, may contain surface-active substances in small weight fractions as additives, as known, for example, from coatings production for improvement of leveling. Particularly suitable surface-active substances are organosiloxanes which are used, as coating assistants. The organosiloxanes, as oligomers, may also themselves have mesogenic properties. When the polymer film is to remain on the substrate after the crosslinking, the adhesion to the substrate, depending on the properties of the substrate surface, may be improved by suitable adhesion promoters in the polymerizable mixture, which likewise are known from the prior art. An improvement in the adhesion of the polymer film to the substrate may also be achieved by suitable pretreatment of the substrate, for example by a corona discharge treatment. When the additives themselves have no mesogenic properties, they are added in such small amounts that they do not impair the formation of the liquid-crystalline phase.

The polymerizable liquid-crystalline material is aligned in such a way that the mesogenic groups become arranged in a helical structure whose axis runs transverse to the layer. Transverse to the layer means that the axis is preferably inclined at an angle of less than 20° relative to the normal to the surface. The axis of the helical structure is more preferably at right angles to the film surface. The mesogens are aligned in the polymerizable mixture, for example, by the shear of the material during the course of application, or after application, by the interaction of the mesogens with the appropriately selected substrate surface or by an electrical or magnetic field. This is preferably effected within a temperature range from above the glass point or melting point to below commencement of clearing of the polymerizable liquid-crystalline material. In order to enable a simple industrial process, the composition of the polymerizable mixtures is preferably adjusted in such a way that the optimum alignment temperature is between 20° C. and 120° C. Because the pitch of cholesteric liquid crystals is generally temperature-dependent, this alignment temperature also influences the center wavelength of the reflection band. When the mesogens are to be aligned by an interaction with the substrate surface, the aligning action may be improved by applying a suitable alignment layer to the substrate by known coating, printing or dipping processes described in the literature. The alignment layer or the substrate may obtain a surface structure which promotes the alignment as the result of additional treatment, for example rubbing. A location-dependent change in the alignment direction is possible, for example, by known processes for structuring an alignment layer in the μm to mm range by means of illumination with polarized UV light through a mask. Suitable processes for achieving an inclination between the mesogens of a liquid-crystalline phase and their interfaces are likewise described in the literature, for example the illumination with polarized UV light or the application by evaporation of inorganic materials at an oblique angle. The alignment layer may also contain an optically uniaxial birefringent medium, for example, an aligned and polymerized layer of a liquid crystal mixture. Particular preference is given to such a layer which, in the wavelength range used, has an optical retardation of 0.25 times the wavelength.

The substrates may be flat or curved. Particular preference is given to substrates which are thermally and mechanically stable in the course of production, processing, and use of the polymer film. Greatly preferred substrates are glass or quartz plates, polymer films, for example polycarbonates, polysulfones, polyalkylene terephthalates, polyalkylene naphthalates, cellulose triacetate and polyimides. If required, the substrate may be provided with an additional alignment aid, for example a layer of polyimide, polyamide, polyvinyl alcohol, a silicon oxide, or with a layer of a polymerized liquid crystal. If the polymer film having a helical molecular structure is to remain on the substrate after its production, suitable substrates are preferably those materials which are useful in producing other optical elements, for example those disclosed by the prior art. Particular preference is given to substrates which are transparent or semitransparent within the wavelength range relevant for the particular application, such as many organic or inorganic substrates. When the polymer film is used as a reflective polarizer for linear-polarized light, a particularly preferred substrate is an optically uniaxial birefringent substrate which has an optical retardation of 0.25 times the wavelength in the wavelength range used. Such a quarter-wave retardation layer, or λ/4 retardation layer for short, is produced, for example, by defined stretching of a polycarbonate film, of a polyethylene terephthalate film or of a polypropylene film, or from a nematic LC polymer. Alternatively, the substrate used may also be a laminate of two different birefringent films whose stretching directions are at an angle relative to each other. As a consequence of the different dispersion of the two films, the total retardation of the laminate also changes with the wavelength. The film material and the degree of stretching are to be selected in such a way that an overall retardation of 0.25 times the wavelength occurs if possible over the entire wavelength range used by the filter or reflector. Of course, a λ/4 retardation layer may also be combined subsequently with the cholesteric layer according to the invention. These requirements on the optical properties of the substrate do not apply when the polymer film is removed from the substrate after the production. In this case, particular preference is given to those substrates which enable good alignment of the polymerizable mixture and impart only low adhesion to the surface.

Daylight is to be avoided if possible when applying the polymerizable mixtures to the substrate surface and during the subsequent alignment of the mesogens, since even the small amount of UV radiation present in daylight is able to bring about a small amount of incipient polymerization of liquid-crystalline mixtures, which leads to a increase in the viscosity and thus to a slowing of the alignment of the mesogens. Therefore, the application of the mixture and the subsequent alignment of the mesogens are preferably carried out with the exclusion of UV radiation. In the film, particles cause disruption to the pitch structure which becomes visible in polarized light as distinct inhomogeneities. In order to prevent this, the polymerizable mixtures should contain no particles which are greater than the thickness of the dry film. The polymerizable mixtures more preferably contain no particles whose longest diameter is greater than 20% of the film thickness. This is ensured by filtering the polymerizable mixture or its constituents or the solutions comprising these constituents before application and cleaning the substrate surfaces under clean room conditions. Preference is also given to effecting the filtering, the application, alignment and polymerization of the polymerizable liquid-crystalline materials under clean room conditions.

On completion of alignment, the polymerizable mixture is exposed briefly to the action of actinic radiation at a preferably constant temperature and thus partly polymerized or copolymerized. Actinic radiation is photochemically active radiation, for example UV radiation, X-ray radiation, gamma radiation, or irradiation with high-energy particles, for example electrons or ions. Preference is given to using UV-A radiation. The irradiation is carried out in such a way that only a fraction of all possible polymerizable molecules is polymerized after the irradiation. The fraction of the polymerized molecules after the irradiation should preferably be between 0.1% and 70%, more preferably between 1% and 50%, of the polymerizable molecules. When the fraction of the polymerized molecules is too low, the crosslinking density gradient is not sufficient, and only a shifting of the center wavelength with no broadening of the reflection band is observed after final fixing of the layer. In contrast, when too many groups are polymerized in the course of the first illumination, the pitch of the helical structure is fixed so strongly from the outset that the formation of a pitch gradient is prevented. This case relates in particular to the conventional process with a single illumination in which more than 70% of the polymerizable molecules are incorporated into the network. The fraction of the polymerized molecules may be determined, for example, by sample illuminations and subsequent extraction in a suitable solvent, and is controlled by the incident illumination energy per unit area and unit time. The incident illumination energy and also its distribution with time are thus important parameters for adjustment of the width of the reflection band of the polymer film according to the invention. For example, short, intensive illuminations with UV-A irradiation in air show good results for the polymerizable mixtures used in examples 1 to 3. The necessary illumination energy depends upon the type of radiation used, upon the material used, upon the photoinitiator, and upon the layer thickness. For the first illumination, the preferred illumination energies per unit area for UV-A radiation are in the range from 1 to 500 mJ/cm$^2$, more preferably in the range from 10 to 50 mJ/cm$^2$. The duration of the illumination is preferably shorter than 30 s, more preferably shorter than 10 s. In comparison, in the conventional illumination which leads to polymerization of over 70% of the polymerizable molecules, illumination energies of more than 500 mJ/cm$^2$ are employed.

After the brief irradiation in an environment having an inhibiting action for the polymerization, the film is exposed to a defined waiting time with exclusion of actinic radiation, during which the material in the semipolymerized structure becomes newly aligned. This waiting time is adjusted to the requirements of the process depending on the composition of the polymerizable liquid-crystalline material, the inhibiting action of the environment, the film thickness and the temperature. It is preferably in the range from 10 s to 60 s, but may, when the process requires it, also be lengthened. The waiting time may proceed at the same temperature as the illumination in the first step or at a different temperature to the illumination in the first step. It is possible, for example, to change the temperature during the waiting time by up to 100° C. compared to the temperature in the first alignment phase, in order to influence the rate of the reflection band broadening. The maximum possible temperature in the waiting time is limited by the clearing point of the incipiently polymerized layer. Preference is given to selecting a temperature in the range from the temperature of the first alignment phase to 10° C. below this clearing point.

However, in order to decouple the process of the partial polymerization and of the final fixing, the waiting time may also be extended and/or the temperature reduced during the waiting time.

In addition to the incident energy of illumination in the first process step, the duration and the temperature of the waiting time are the most important parameters for the setting of the desired width of the reflection band of the polymer film according to the invention. At the same temperature and duration of the waiting time and the same illumination time, the width of the reflection band increases up to a maximum value with increasing illumination energy in the first process step and then decreases again until the reflection band assumes the original shape of a conventionally polymerized film. On the other hand, a longer duration of the waiting time at the same illumination energy in the first process step leads to increasing broadening of the reflection band. The selection of a suitable preillumination energy and an appropriately long waiting time allows bandwidths of above 300 nm to be realized by the process according to the invention.

The waiting time is followed by a further process step in which the alignment state of the film achieved is finally fixed. To this end, the film may be fully polymerized or the film may be cooled into the glass state. When the fixing is effected by a polymerization reaction, this reaction is preferably initiated by illumination with actinic light of high intensity, electron irradiation or free radical-forming thermal initiators such as peroxides. However, the crosslinking may also be brought about by means of crosslinkers containing hydrogen atoms bonded directly to silicon with catalysis by platinum metal catalysts, or it may be effected cationically or anionically. Particular preference is given to crosslinking by UV light with an energy dose of more than 500 mJ/cm$^2$. Preference is given to simultaneously reducing the inhibiting action of the preillumination environment, for example by carrying out the polymerization in an inert gas atmosphere, for example nitrogen. The oxygen content of the inert gas atmosphere is more preferably less than 1%. However, the partly polymerized film may also be covered with a film which serves as a barrier layer against the inhibiting influence of the environment.

The resulting polymer film may also be used together with the substrate in the form of a laminate or as a free film after removal of the substrate. Another preferred application form of the polymer film having helical molecular structure is in the production of LC pigments by comminuting the polymer films, grinding and sieving. EP 0 601 483 A1 describes how pigments having liquid-crystalline structure with a chiral phase which reflect colored light can be produced by removing a polymerized cholesteric film from the substrate and subsequently comminuting the rough chips obtained in this way. Afterward, the pigments may be incorporated into a suitable binder system and applied to a substrate. In the case of LC pigments, the particle size in particular is an important parameter for many applications. For the same shape factor, thinner pigments form smaller particles which feature, for example, a more homogeneous visual impression and, in coatings, also a lower topcoat level. In various printing processes, only a maximum particle size is possible. The process for producing LC pigments has the advantage, that owing to the adjustable steep gradient of pitch, very thin pigment platelets having broadened reflection bands can be produced. Preference is given in many applications to LC pigments having a thickness of from 1 µm to 10 µm; particular preference is given to a thickness of from 1 µm to 6 µm.

As a consequence of their broader reflection band, LC pigments having broadened reflection bands exhibit higher light reflection and therefore achieve higher brilliance. In addition, selectively broadened reflection bands in comparison to the classical LC pigments (Helicone® HC; Wacker-Chemie GmbH, Munich) can be used to achieve new hues and effects. When the concentration of the chiral species is selected in such a way that the reflection band is at least partly within the visible wavelength range, these LC pigments are outstandingly suitable for decorative applications. Also of interest are highly reflective, color-neutral LC pigments whose reflection bands cover the entire visible spectral region and thus give rise to metallic effects. For the production of safety markings for protection from forgeries of, for example, banknotes, security-printed articles, documents or in trademark protection, LC pigments may be used most advantageously, since they can usually be incorporated with relatively little cost or inconvenience into the printing or other coating processes already existing in these applications. Owing to the color effects and the polarization of the reflected light, good protection against unauthorized copying is achieved in these applications. A particular advantage of the LC pigments according to the invention is that, owing to the broader reflection bands when observed by right-handed and left-handed helical circular polarizers or in polarization-sensitive detectors, they enable higher brightness contrast and are thus even easier to recognize. IR-reflecting LC pigments are suitable in order to produce markings which are invisible to the human eye and, owing to their good reflection, can be registered within the IR region of instruments having IR detectors. Such LC pigments which are obtained at a low concentration of chiral species are preferably transparent and colorless in the region of visible light. The wavelength of the lower band edge of the reflection band is preferably above 750 nm. In all wavelength ranges, the LC pigments according to the invention may also be used for the production of optically imaging, wavelength- and polarization-selective elements on curved substrates (EP 0 685 749 A1).

In order to apply the LC pigments to a substrate, they are, as described, for example, in EP 0 601 483 A1 or EP 0 685 749 A1, incorporated into a suitable binder system. The required properties of the binder systems, especially the optical properties, depend upon the intended application of the LC pigments. Preference is given to using binders which are optically transparent at least in the region of the reflection wavelength. For optical elements, preference is given to using binder systems whose average refractive index after curing is similar to the average refractive index of the LC pigments. To produce durable layers which comprise LC pigments, suitable binder systems are preferably curable. However, for specific applications, noncurable binders may also be used, for example oils and pastes. Particular preference is given to binder systems which only change the physical properties of the LC pigments in a defined manner, if at all. Suitable binder systems are, for example, polymerizable resins (PU resins, silicone resins, epoxy resins), dispersions, solvent-containing coating materials or water-borne coating materials or any transparent plastics, for example polyvinyl chloride, polymethyl methacrylate, polycarbonate. In addition to these isotropic binders, liquid-crystalline systems may also be used as binders, for example liquid-crystalline polymers or polymerizable liquid-crystalline resins. To produce films having specific anisotropic optical properties, the LC pigments are stirred into a liquid binder. The alignment of the platelets parallel to the surface of the layer occurs in the course of application of a thin layer of the pigment-binder mixture to a substrate, in the course of extrusion of the mixture or in the course of drying. Depending on the requirements of the particular application and the properties of the binder, the film may be removed from the substrate after the curing.

The control of the center wavelength and of the width of the reflection band of a polymer film having a helical molecular structure which is possible by the inventive process allows the desired photometric properties of optical elements such as polarizers, color filters, pigments or reflectors, and especially also of structured filters and reflectors for left-handed or right-handed circular-polarized light, to be attained in a simple manner. The invention therefore also relates to optical elements, for example filters, reflectors and polarizers, which comprise at least one layer of an inventive polymer film having helical molecular structure. These layers in the optical elements have reflection bands having preferably more than 1.5 times the bandwidth $\Delta\lambda = \lambda \cdot (n_e - n_o)/n$ which would correspond to the polymerizable liquid-crystalline material on the basis of its refractive index anisotropy alone. The polymer film is suitable as an optical element or part of an optical element together with the substrate or, after removal of the substrate, also as a free film. To this polymer film or the substrate may be applied further polymer films having helical molecular structure or else other layers, for example homeotropically aligned or planar-aligned retardation layers (e.g. a $\lambda/4$ retardation layer), absorptive polarization films, color films or adhesive layers. However, it is also possible to produce optical elements by means of a process according to the invention in which the carrier substrate used for the polymerizable liquid-crystalline material is a retardation layer which has, for example, over the entire wavelength range used if at all possible, a retardation value of a quarter of the particular wavelength.

In optical instruments which work with polarized light, for example liquid-crystal displays, the polymer films are advantageously used as a reflective circular polarizer for colored, or else white light. Further examples of applications in optics are filters (EP 0 302 619 A2) and optically imaging, wavelength- and polarization-selective elements for the entire wavelength range from the infrared to the near UV (EP 0 631 157 A1). Possible applications of these optical elements are, for example, beam splitters, mirrors and lenses. The invention also relates to the use of an inventive polymer film as a reflective polarizer in liquid-crystal displays, as described, for example, in EP 0 606 939 A1 and EP 0 606 940 A2. Other units which comprise at least one layer of an inventive polymer film having helical molecular structure and/or inventive LC pigments likewise form part of the subject matter of this invention. Such units are, for example, projectors, projection displays and lamps which enable low-dazzle illumination by means of polarized light.

In addition to the optical applications in the visible wavelength range, the inventive polymer films, at a low concentration of the chiral species, are suitable for producing filters which reflect circular-polarized light in the infrared range (IR). The use of curved substrates thus enables in particular the production of optically imaging, polarization-selective elements in the IR range. Particular preference is given for many applications to such IR-reflecting polymer films and LC pigments which are fully transparent to visible light. To this end, the wavelength of the lower band edge is preferably above 750 nm. One application of such IR layers is, for example, machine-readable inscriptions or markings which are invisible to the human eye, for example security markings on security-printed articles or in trademark protection. In these applications, the circular polarization of the reflected IR radiation is especially advantageous, since this is a safety feature which can only be copied with difficulty.

Another application of the IR-reflecting polymer films and LC pigments is colorless and transparent protective layers against heat radiation, for example for thermal insulation glazing of buildings or vehicles. Since it is important in this application to as far as possible reflect the entire heat radiation, preference is given here to combining two layers having very broad reflection band and having opposite sense of rotation of the cholesteric helix in order to reflect left-handed and right-handed helical polarization.

Digital and analog optical storage media which are based on a localized change in the helical structure can be produced by locally changing the alignment of the mesogenic groups before the final polymerization. This may be achieved, for example, by localized UV irradiation through a mask which is opaque to UV radiation when the externally active alignment forces or the temperature of the polymer films are changed between the individual illumination steps, or by localized heating of the polymer films, for example by a laser, or by locally changing the HTP (helical twisting power) of the chiral species present, for example by UV-induced isomerization.

Cholesteric liquid crystals are thermochromic in the non-polymerized state, i.e. in the event of a temperature change in the region of the cholesteric phase, the pitch of the helical molecular structure and thus the reflection wavelength change. U.S. Pat. No. 4,637,896 and R. Maurer et al., "Cholesteric Reflectors with a Color Pattern", SID International Symposium Digest of Technical Papers, Vol. 25, San Jose, Jun. 14-16, 1994, p. 399-402 describe how this effect may be utilized to achieve full-surface, colored structuring of an LC polymer film by irradiating individual regions of the film with actinic light at different temperatures successively through a mask. When the temperature range of the liquid-crystalline phase is wide enough, it is possible in this way to produce color and polarization filters having red, green and blue pixels which may be used, for example, as LCD color filters. Particular preference is given for this application to polymer films having a width of the reflection bands of approx. 80-110 nm, since this bandwidth enables maximum brightness and color saturation of the individual color pixels. In combination with a circular polarizer for white light of opposite helicity, such a structured color filter may also serve to further increase the brightness of an LCD or other optical instruments which work with polarized light.

To produce structured polymer films having helical molecular structure with broadened reflection bands, the above-described process is modified in such a way that individual illuminations of the material with actinic radiation are effected through a mask. Subsequently, the mask is shifted or replaced by a second mask and the illumination of the material with actinic radiation is repeated, optionally with variation in further parameters of the preceding steps, in such a way that a part of the film which has not yet been irradiated is irradiated and/or a part of the material which has not yet been finally fixed is irradiated again. A variation in a parameter of the preceding steps means that, when the process is repeated, another reflection color is set for the material region which is now irradiated, for example, by varying the temperature in the course of the illumination in the first process step, or that, by appropriately selecting temperature and/or duration of the waiting time in the following process step, the bandwidth of the reflection band for the material region which is now irradiated is set to a different value. If appropriate, this process is repeated as often as required with regions of the material which have not yet been irradiated. In this way, it is possible, for example, to generate a multicolored photostructured filter or reflector whose individual colors can be freely adjusted via the particular selection of the center wavelength and width of the reflection band. Examples of the detailed procedure when adjusting the center wavelengths and widths of the reflection bands of different pixels are given in EP 0 885 945 A1.

EXAMPLES

The invention is illustrated by the examples which follow without being restricted thereby. In these examples, unless stated otherwise in each case, all amounts and percentages are based on the weight. The mixture components used in the examples and their syntheses are known from the prior art.

Example 1a

Preparation of a Liquid-crystal Mixture (Mixture 1)

25 g of the polymerizable mesogenic compound hydroquinone bis(4-acryloylbutoxy)benzoate (prepared by the process of EP 1 059 282 A1), 45 g of the polymerizable mesogenic compound 4"-cyanobiphenyl-4-(4'-acryloylbutoxy)benzoate (prepared according to M. Portugall et al., Macromol. Chem. 183 (1982) 2311), 30 g of the mesogenic compound 4'-cyanobiphenyl-4-allyloxybenzoate (prepared according to EP 0 446 912 A1), 8.2 g of the polymerizable chiral species 2,5-bis-[4-[(1-oxo-2-propenyl)oxy]benzoyl]-1,4:3,6-dianhydro-D-glucitol (according to EP 1 046 692 A1), 90 mg of AF98/300 silicone oil (Wacker-Chemie GmbH/Munich) and 220 mg of 2,6-di-tert-butyl-4-methylphenol (BHT) stabilizer were dissolved in a solvent mixture of 110 g of tetrahydrofuran (THF) and 220 g of toluene. Before use, the solution was filtered in order to exclude particles greater than 1 µm, and 2.2 g of 2-methyl-1-[4-(methylthio)phenyl]-2-morpholinopropanone-1 photoinitiator (Irgacure® 907; Ciba Spezialitätenchemie GmbH/Lampertsheim) were added.

Comparative Example 1b

Mixture 1 was applied in a coating unit under cleanroom conditions and exclusion of UV radiation with yellow ambient light to a continuously moving polyethylene terephthalate (PET) film. The wet film was dried in air at 110° C. for approx. 1 minute. This resulted in a tacky film which was opaque at room temperature and had a homogeneous thickness of approx. 6 µm. The film was heat-treated in air at 90° C. for two minutes with exclusion of UV radiation, in the course of which it became completely clear, and it was then irradiated with a high UV dose of approx. 650 mJ/cm$^2$ at 90° C. in a low-oxygen nitrogen atmosphere (oxygen content <0.5%) and thus crosslinked.

The resulting nontacky and scratch-resistant film had a blue color when viewed at right angles in daylight. The measurement of the transmission in a UV/VIS spectrometer resulted in a virtually box-shaped band at 425 nm with a half-height width of 70 nm.

Example 1c

Production of an Inventive Polymer Film

Mixture 1 was applied as in comparative example 1b) to a continuously moving polyethylene terephthalate (PET) film in a coating unit with exclusion of UV radiation. The wet film was dried in air at 110° C. for 1 minute. This resulted in a tacky film which was opaque at room temperature and had a homogeneous thickness of approx. 6 µm. The film was heat-treated at 90° C. in air for a further minute, in the course of which it became completely clear, and was then irradiated with UV-A radiation (total dose 25 mJ/cm$^2$) for 0.3 s. After a further minute at unchanged temperature with the exclusion of UV radiation, the film was irradiated with a high UV dose of approx. 650 mJ/cm$^2$ at 90° C. in a low-oxygen nitrogen atmosphere (oxygen content <0.5%) and thus finally crosslinked.

The resulting nontacky and scratch-resistant film had a silvery color when viewed at right angles in daylight. The light reflected by the film had right-handed circular polarization and the light allowed to pass through by the film had left-handed circular polarization. The measurement of the transmission of left-handed circular-polarized light in a UV/VIS spectrometer (Spectro 320 from Instrument Systems) resulted in a virtually box-shaped band from 450 nm to 710 nm (measured in each case at 50% transmission for left-handed circular-polarized light).

A cross section of the film was imaged using a scanning electron microscope and the pitches were then measured. The average pitch of the first three helices on the side facing the PET substrate was 320 nm. At an average refractive index of 1.66 which was measured using a prism coupler (Metricon model 2010), this corresponds to an average reflection wavelength of 530 nm. Afterward, the pitch rises approximately linearly to 420 nm (corresponding to a wavelength of 700 nm) up to the 8th turn and then remains constant up to the 10th turn. Between the 10th and 12th turn, the pitch falls sharply to 270 nm (corresponding to a wavelength of 450 nm) and retains this value up to the 14th turn. On the open surface of the film which begins at the 15th turn, slight untwisting of the helix to give an alignment of the mesogens inclined toward the surface is observed.

To assess the light amplification effect when used as a reflective polarizer, the LC polymer film, a λ/4 retardation film and a linear polarizer at a 45° angle to the axis of the λ4 film were laid on a commercial backlight for LCD displays and the light intensity was measured. The same measurement was carried out with an arrangement of LCD backlight with linear polarizer without LC polymer film and without λ4 film. When the two measurements were compared, it was found that, when viewed at right angles, the brightness of the arrangement with LC polymer film was 42% brighter than without LC polymer film. Averaged over all viewing angles up to 60°, the amplification of the brightness was 30%.

To test the stability of the film, it was stored in a heating cabinet at 80° C. for 8 days and the transmission was subsequently measured once more in the UV/VIS spectrometer. The film which was unchanged according to visual assessment exhibited an unchanged, virtually box-shaped band from 450 nm to 710 nm in transmission.

Comparative Example 1d

Mixture 1 was applied as in comparative example 1b) to a continuously moving polyethylene terephthalate (PET) film in a coating unit with the exclusion of UV radiation. The wet film was dried in air at 110° C. for 1 minute. This resulted in a tacky film which was opaque at room temperature and had a homogeneous thickness of approx. 6 µm. A second PET film was laminated onto this film as a top layer. The laminated film was heat-treated as in comparative example 1c) at 90° C. in air for 1 minute, in the course of which it became completely clear and then illuminated with UV-A radiation (total dose 25 mJ/cm$^2$) for 0.3 s. After a further minute at unchanged temperature with the exclusion of UV radiation, the film was irradiated with a high UV dose of approx. 650 mJ/cm² at 90° C. in a low-oxygen nitrogen atmosphere (oxygen content <0.5%) and thus finally crosslinked.

The resulting nontacky and scratch-resistant film, when viewed at right angles in daylight, had a blue color. The measurement of the transmission in a UV/VIS spectrometer resulted in a virtually box-shaped band at 430 nm having a half-height width of 75 nm.

Comparative Example 1e

In the course of the production of a polymer film in accordance with comparative example 1d), after the LC film had been dried, the top layer which was laminated on was a cellulose triacetate (TAC) film instead of a polyethylene terephthalate (PET) film. The film, which was nontacky and scratch-resistant after the final crosslinking, when viewed at right angles in daylight, likewise had a blue color. The measurement of the transmission in a UV/VIS spectrometer resulted, as in comparative example 1d), in a virtually box-shaped band at 430 nm having a half-height width of 75 nm.

Example 2a

Preparation of a Liquid Crystal Mixture (Mixture 2)

79 g of the polymerizable mesogenic compound hydroquinone bis(4-acryloylbutoxy)benzoate (prepared by the process of EP 1 059 282 A1), 79 g of the polymerizable mesogenic compound 4"-biphenyl-4-(4'-acryloylbutoxy)benzoate (prepared according to U.S. Pat. No. 4,293,435), 13 g of the polymerizable chiral species 2,5-bis[4-[(1-oxo-2-propenyl)oxy]benzoyl]-1,4:3,6-dianhydro-D-glucitol (according to EP 1 046 692 A1), 110 mg of AF98/300 silicone oil (Wacker-Chemie GmbH/Munich) and 350 mg of 2,6-di-tert-butyl-4-methylphenol (BHT) stabilizer were dissolved in a solvent mixture of 120 g of tetrahydrofuran (THF) and 240 g of toluene. Before use, the solution was filtered in order to exclude particles greater than 1 µm and 3.5 g of 2-methyl-1-[4-(methylthio)phenyl]-2-morpholinopropanone-1 photoinitiator (Irgacure® 907; Ciba Spezialitätenchemie GmbH/Lampertsheim) were added.

Comparative Example 2b

Mixture 2 was applied to a continuously moving polyethylene terephthalate (PET) film in a coating unit under cleanroom conditions and exclusion of UV radiation with yellow ambient light. The wet film was dried in air at 110° C. for 1 minute. This resulted in a tacky film which was opaque at room temperature and had a homogeneous thickness of approx. 6 µm. The film was heat-treated at 95° C. in air for two minutes with the exclusion of UV radiation, in the course of which it became completely clear, and was then irradiated with a high UV dose of approx. 650 mJ/cm² at 95° C. in a low-oxygen nitrogen atmosphere (oxygen content <0.5%) and thus crosslinked.

The resulting nontacky and scratch-resistant film had, when viewed at right angles in daylight, a blue color. The measurement of the transmission in a UV/VIS spectrometer resulted in a virtually box-shaped band at 470 nm having a half-height width of 55 nm.

Example 2c

Production of an Inventive Polymer Film

Mixture 2 was applied as in comparative example 2b) to a continuously moving polyethylene terephthalate film in a coating unit with the exclusion of UV radiation. The wet film was dried in air at 110° C. for 1 minute. This resulted in a tacky film which was opaque at room temperature and had a homogeneous thickness of approx. 6 µm. The film was heat-treated at 95° C. in air for a further minute, in the course of which it became completely clear, and was then illuminated with UV-A radiation (total dose 25 mJ/cm²) for 0.3 s. After a further minute at unchanged temperature with the exclusion of UV radiation, the film was irradiated with a high UV dose of approx. 650 mJ/cm² at 95° C. in a low-oxygen nitrogen atmosphere (oxygen content <0.5%) and thus finally crosslinked.

The resulting nontacky and scratch-resistant film, when viewed at right angles in daylight, had a golden color. The light reflected by the film had a right-handed circular polarization. The measurement of the transmission in the UV/VIS spectrometer showed a broadened reflection band from 500 nm to 680 nm (measured in each case at 50% transmission for left-handed circular-polarized light). The pitch distribution was asymmetric and had the longest pitch on the side of the PET substrate.

Example 2d

Production of LC Pigments

The LC polymer film from example 2c) was scraped off the PET film using a blade, comminuted and subsequently ground in an Alpine 200 LS universal laboratory mill. In this way, particles up to an average particle diameter of about 50 µm were produced. The resultant pulverulent material was subsequently sieved by means of an analysis sieve having a mesh width of 50 µm and then incorporated into a conventional alkyd-melamine resin binder system (Sacolyd F410/Sacopal M 110; Kolms Chemie/Krems, Austria). The viscosity of the binder system was adjusted to an efflux time of approx. 80 sec with a diluent (mixture of aromatic hydrocarbons and methyl isobutyl ketone) in a DIN 4 flow cup.

The mixture of LC pigments and binder obtained in this way was knife-coated in a wet film layer thickness of 120 µm to a black-primed metal sheet with the aid of a film applicator (from Erichsen). Subsequently, the metal sheet was dried at 80° C. for one hour. When viewed at right angles, the metal sheet after drying exhibited a highly glossy, silvery-gold color which changed to a silvery-green hue at narrower viewing angles. Viewing with right-handed and left-handed circular polarizers allows a particularly apparent light-dark contrast in daylight and also in artificial light to be detected which has a more distinct visual appearance than in the case of Helicones® pigments (Wacker-Chemie GmbH/Munich) which are produced from a polymer film having helical molecular structure without broadening of the cholesteric band.

Example 3

A glass plate was provided with an alignment layer of polyimide which was rubbed unidirectionally with a velvet cloth. Mixture 2 was applied to the polyimide layer by spin-coating with the exclusion of UV radiation under yellow ambient light, and then dried at room temperature for a few minutes until an opaque, tacky film having a thickness of approx. 5 μm remained. Afterward, the film was placed in a heatable casing having a quartz window which was filled with air. The temperature of the casing was set to 55° C. Once the film had become clear, one half of the film (zone 2) was covered by an aluminum film and then the uncovered half (zone 1) was illuminated with UV-A radiation (total dose approx. 26 mJ/cm$^2$) through the quartz window under air for 0.8 s. The illumination source used was a mercury arc lamp (model 68810, L.O.T.-Oriel GmbH) whose shutter was activated with a timeswitch. Subsequently, the temperature in the casing was increased to 95° C. The aluminum foil was removed and once the film had become clear again, it was once more illuminated with UV-A radiation (total dose 26 mJ/cm$^2$) under air for 0.8 s. Subsequently, the casing was filled with nitrogen. After a minute at unchanged temperature, the film was finally crosslinked with a UV dose of approx. 2 J/cm$^2$ in the nitrogen atmosphere at 95° C.

The resulting nontacky and scratch-resistant film, when viewed at right angles in daylight, had a copper-red color in zone 1 and green-yellow color in zone 2. The light reflected by the film had right-handed circular polarization. The measurement of the transmission in the UV/VIS spectrometer showed a broadened reflection band from 550 nm to 710 nm in zone 1 (measured in each case at 50% transmission for left-handed circular-polarized light) and from 480 nm to 650 nm in zone 2. The pitch distribution was asymmetric with the longer pitch in each case on the side of the glass plate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer film comprising a helical molecular structure which contains, in a direction transverse to the film, at least three sequences of helical molecular structure: a first sequence having a first helical pitch; a second sequence having a second helical pitch; and a third sequence having a third helical pitch, in the same order as listed, each of said first, second, and third sequences comprising at least three turns of helical molecular structure, the first helical pitch being shorter than the second helical pitch, and the third helical pitch being intermediate the first and second helical pitches, the change in helical pitch between the first helical pitch and the second helical pitch taking place in less then 10 turns of the helical structure, the helical pitches calculated based on reflection wavelength/average refractive index, the film comprising a single layer of a polymerized mixture of polymerizable liquid-crystalline material.

2. The polymer film of claim 1, wherein the film has a reflection band which has been broadened by at least 50% compared to the reflection band in the unpolymerized state.

3. The polymer film of claim 1, wherein the thickness of the film is from 2 to 20 times the width of the reflection band divided by ($n_e$-$n_o$) where $n_e$ and $n_o$ are the refractive indices for the extraordinary ($n_e$) and the ordinary ($n_o$) beams in a birefringent medium.

4. The polymer film of claim 1, wherein the substrate is a polymer film which contains no additional oxygen barrier layer.

5. The polymer film of claim 1, wherein partial polymerization of the polymerizable mixture is effected at a temperature within a phase range having helical alignment of mesogens of the liquid-crystalline material.

6. The polymer film of claim 1, wherein an environment having an inhibiting action formed by a gas which comprises oxygen is present during a first, partial polymerization.

7. The polymer film of claim 1, wherein the mixture of polymerizable liquid-crystalline material comprises monomers or oligomers which differ in their reactivity with respect to polymerization.

8. The polymer film of claim 1, wherein polymerization is effected by actinic radiation acting through a mask in the course of a partial polymerization, in the course of a final fixing or in the course of both, and the mask is subsequently altered or replaced by a second mask, and this process step is repeated optionally with alteration of further process parameters in such a way that a portion of the material which is yet to be finally fixed is irradiated with actinic radiation.

9. An LC pigment having helical molecular structure, prepared by comminuting the polymer film of claim 1.

10. A wavelength-selective or polarization-selective optical element for electromagnetic radiation from the near ultraviolet to the infrared range, comprising at least one layer of the polymer film of claim 1.

11. A reflective linear polarizer, comprising in combination, the polymer film of claim 1, and a λ/4 retardation film.

12. In a reflector or polarizer in a liquid-crystal display, visible or invisible marking, security element, reflector for heat or infrared radiation or for decorative purposes, wherein a reflective polymer film or pigment is employed, the improvement comprising employing as at least one film and/or one pigment prepared by comminuting a film thereof, wherein the film is the polymer film of claim 1.

13. A projector, projection display or illumination body comprising at least one layer of the polymer film of claim 1.

14. The projector, projection display, or illumination body of claim 13, wherein said layer of polymer film has been comminuted into particles.

15. A liquid-crystal apparatus having a liquid-crystalline material disposed between two electrodes, comprising at least one of the polymer film of claim 1, at least one film for generating or increasing the yield of polarized light, and optionally further optical components selected from the group consisting of light source(s), mirror(s), polarizer(s), retarder(s), color filter(s) and combinations thereof.

16. A liquid-crystal apparatus having a liquid-crystalline material disposed between two electrodes, optionally further optical components selected from the group consisting of light source(s), mirror(s), polarizer(s), retarder(s), and color filter(s), and at least one film for selecting colored light comprising the polymer film of claim 1.

17. A process for producing a polymer film having an adjustable pitch gradient of a helical molecular structure, comprising the steps of:
a) applying in a layer on a substrate, a mixture of polymerizable liquid-crystalline material which comprises a) i) at least one monomer or oligomer, each of which has at least one mesogenic group and at least one polymerizable functional group, and a) ii) at least one chiral compound,
b) aligning the material such that the mesogenic groups become arranged in a helical structure whose axis is transverse to the layer,
c) partially polymerizing the layer by the action of actinic radiation in an environment which has an inhibiting action on the polymerization, and
d) after the material has become newly aligned in a semi-polymerized structure, final fixing by fully polymerizing the film or cooling the film into the glass state, wherein the final polymer film comprises a helical molecular structure which contains, in a direction transverse to the film, at least three sequences of helical molecular structure: a first sequence having a first helical pitch; a second sequence having a second helical pitch; and a third sequence having a third helical pitch, in the same order as listed, each of said first, second, and third sequences comprising at least three turns of helical molecular structure, the first helical pitch being shorter than the second helical pitch, and the third helical pitch being intermediate the first and second helical pitches, the change in helical pitch between the first helical pitch and the second helical pitch taking place in less then 10 turns of the helical structure, the helical pitches calculated based on reflection wavelength/average refractive index.

18. The process of claim 17, wherein the application of a mixture of polymerizable liquid-crystalline material and the subsequent alignment of the mesogens are carried out under cleanroom conditions with the exclusion of UV radiation.

19. The process of claim 17, wherein steps c) and d) are performed at the same temperature.

20. The process of claim 17, wherein a free radical scavenger which is initiated by oxygen is included in the mixture of polymerizable liquid-crystalline material applied in step a).

21. The process of claim 17, wherein the environment which has an inhibiting action comprises air or air enriched with oxygen, or is a gas containing nitrogen monoxide.

* * * * *